United States Patent [19]
Stuart, Jr.

[11] Patent Number: 6,158,375
[45] Date of Patent: Dec. 12, 2000

[54] BOAT WAKE ENHANCER

[76] Inventor: Kenneth L. Stuart, Jr., P.O. Box 1168, Copperhill, Tenn. 37317

[21] Appl. No.: 09/324,600

[22] Filed: Jun. 2, 1999

Related U.S. Application Data
[60] Provisional application No. 60/087,688, Jun. 2, 1999.

[51] Int. Cl.⁷ .......................................................... B63B 1/00

[52] U.S. Cl. ........................................... 114/271; 114/253

[58] Field of Search .................................... 114/271, 274, 114/280, 284, 253

[56] References Cited

U.S. PATENT DOCUMENTS

| | | | |
|---|---|---|---|
| 1,835,618 | 12/1931 | Waller | 114/284 |
| 5,222,455 | 6/1993 | Furey | 114/270 |
| 5,860,384 | 1/1999 | Castillo | 114/280 |
| 5,979,350 | 11/1999 | Larson et al. | 114/253 |

*Primary Examiner*—Stephen Avila
*Attorney, Agent, or Firm*—Miller & Martin LLP

[57] ABSTRACT

A boat wake enhancer is described comprising a water tank mounted at the rear of an inboard motor boat, wherein the tank can be filled and emptied while the boat is in use. When filled, a more desirable wake is provided for water skiing and when emptied, the boat will plane more easily and generate a smaller wake.

20 Claims, 5 Drawing Sheets

BOAT WAKE ENHANCER

The present application claims priority of provisional application Ser. No. 60/087,688 filed Jun. 2, 1999.

FIELD OF THE INVENTION

The present invention is a Boat Wake Enhancer designed to improve the wake characteristics of a ski boat.

BACKGROUND OF THE INVENTION

In the sport of water skiing, there are many variables that affect the enjoyment of the sport. These include characteristics of the water skis, the skill of the ski boat driver, water conditions, power of the ski boat, and even the characteristics of the wake left by the ski boat.

In order to provide for more enjoyable skiing when the water skier crosses the wake of the ski boat, it is desirable that a large wake be created without excessive turbulence. In order to improve the wake characteristics of ski boats, it is known to increase the weight of the back of the ski boat by placing large water filled bags weighing several hundred pounds at the rear of the boat. While this increases the size of the wake, it does not improve the turbulence and the bags are cumbersome to fill and empty before and after skiing.

Accordingly, the present invention provides a tank that may be filled with water to increase the weight at the rear of the boat by several hundred pounds and which extends rearward of the boat and provides several wake enhancing characteristics.

OBJECTS OF THE INVENTION

It is therefore an object of the invention to improve the wake characteristics of an inboard ski boat by the use of a water tank that can be easily filled and emptied.

It is a further object of the invention to provide a boat wake enhancer which positions additional weight behind the boat's transom.

It is yet a further object of the inventor to provide a boat wake enhancer which can be easily filled and emptied of water without the use of pumps.

It is another object of the invention to provide a boat wake enhancer which reduces the turbulence of the wake.

It is yet another object of the invention to provide a boat wake enhancer which increases the height of the boat wake in a regular fashion.

DETAILED DESCRIPTIONS OF THE DRAWINGS

Figure 1:
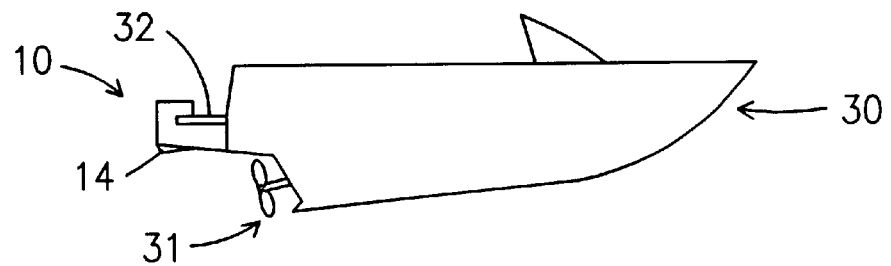
FIG. 1 is a side view of an inboard ski boat with the present invention in place.

FIG. 1 shows a typical inboard ski boat 30 with propeller 31 and ski platform 32. The wake enhancer 10 of the present invention is mounted about the ski platform 32 and bolted to the rear of the ski boat 30. Also visible is an optimal down strake 14 which provides additional tank strength and rigidity while also improving the tracking of the ski boat 30 in the water.

Figure 4:
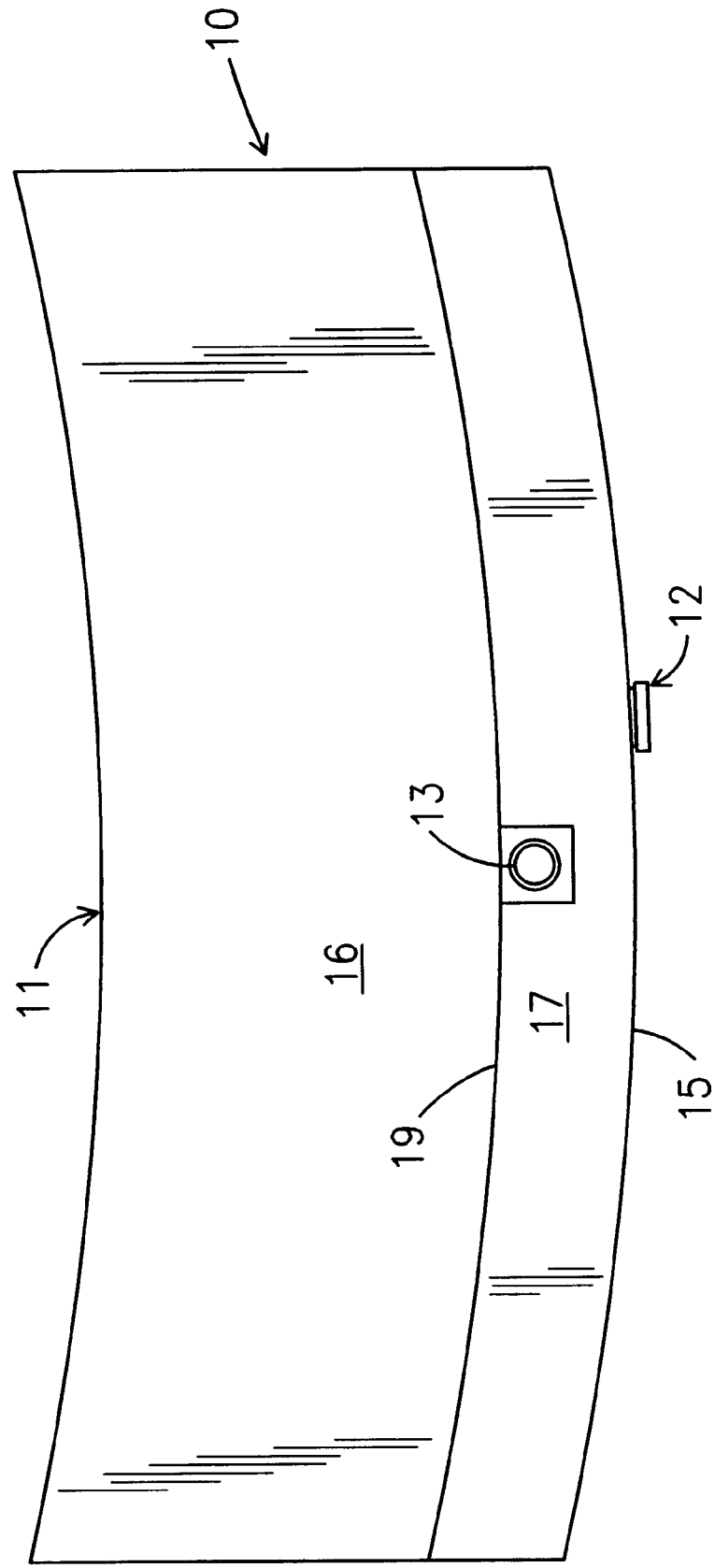
FIG. 4 is a top plan view of an embodiment of the present invention mounted.

FIG. 4 shows that the wake enhancer 10 preferably has a fluid containing section with a closeable opening such as valve 12 on its rearward facing surface 15 positioned to be under water when the ski boat 30 is stationary. Also, the fluid containing section of the wake enhancer 10 has another closeable opening such as plug 13 located on its upper portion which would usually remain out of the water whether the ski boat 30 was stationary or moving. The preferred length of the wake enhancer is about 24 inches as it should fit beyond the swim platform 32 (shown in FIGS. 1 and 6) which will typically extend approximately 17 inches rearward from the boat 30. In any event, the boat wake enhancer should be less than 36 inches in length to avoid producing unfavorable wake characteristics and must be greater than 17 inches in length in order to fit around the swim platform 32. The width of the top surface of the tank is preferably about 64 inches, although this may be varied so long as it is less than the customary width of an inboard ski boat and the deep section of the tank 10 is preferably about 44 inches and sufficiently wide to cover the central portion of the boat wake 40. A tank 10 thus configured should provide sufficient volume to hold several hundred pounds of water. Preferably, the tank will hold between about 200 and 800 pounds of water although about 350 to 500 pounds are believed to be preferable. The top view of the wake tank 10 in FIG. 4 discloses the arcuate of forward surface 11 which fits adjacent to the rear transom of the ski boat. For esthetic purposes, the trailing surface 15 is also preferably of matching arcuate configuration. The top surface of wake tank 10 has two levels, a lower level 16 which fits beneath the swim platform 32 and an upper level 17 which mounts about flush with the top of swim platform. Riser 19 fits adjacent the rear edge of swim platform 32 and connects the upper level 17 and lower level 16. In a preferred configuration shown in FIG. 1, the upper portion 17 actually forms a lip over the top of the trailing edge of swim platform 32. However, manufacturing considerations make this alternative design more costly.

Figure 5:
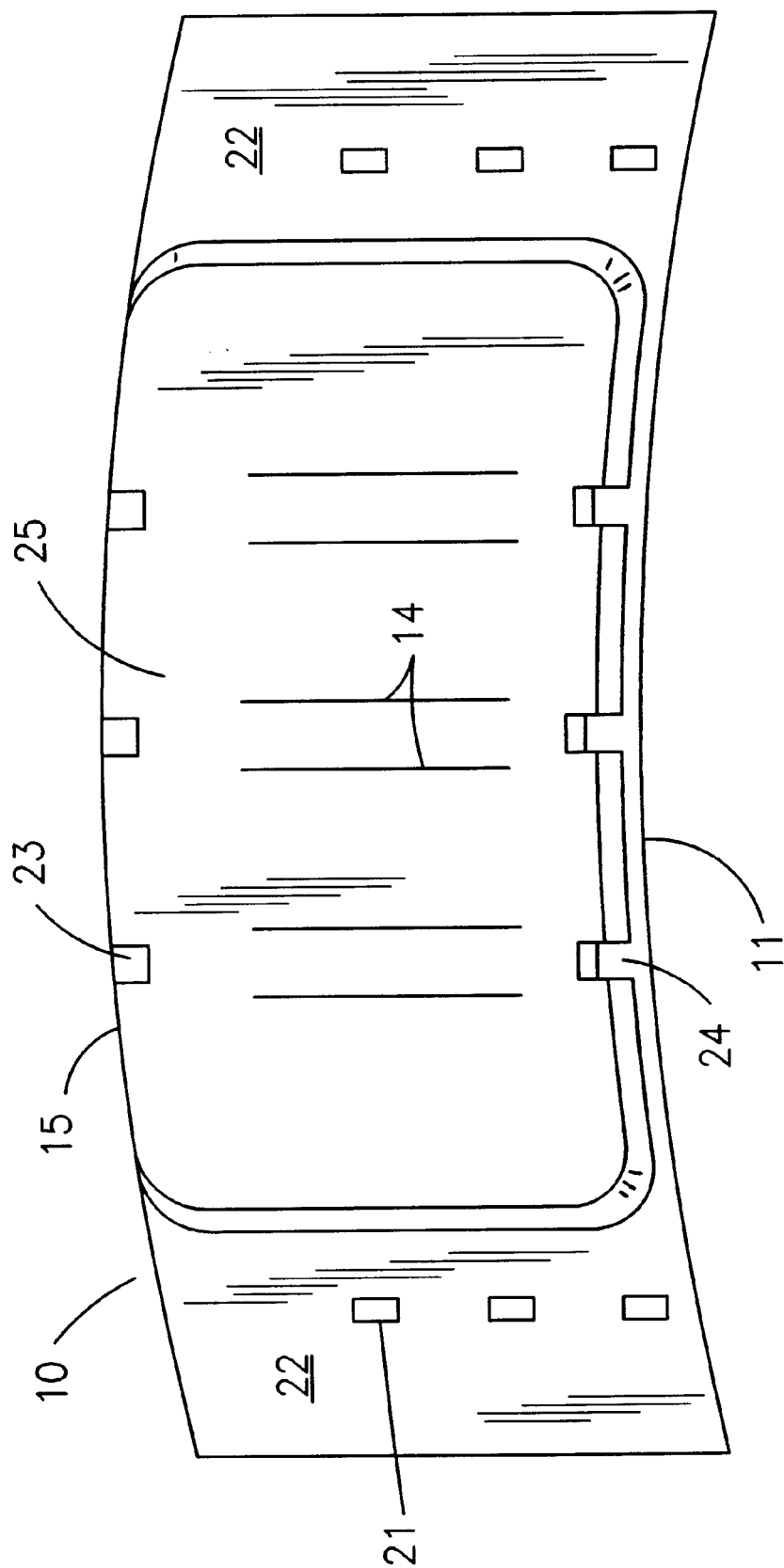
FIG. 5 is a bottom plan view of the boat wake enhancer shown in FIG. 4.

FIG. 5 shows a bottom plan view of wake tank 10 and shows that the central deep portion 25 is centered between two wings 22. Each wing is fitted with a mounting section such as the series of three kiss-offs 21 shown. In order to mount the wake tank 10, a swim platform 32 is removed from its mounting brackets at the rear of ski boat 30. Wake tank 10 is placed on those mounting brackets and the kiss-off sections 21 are alined with openings on the mounting bracket arms. Then the swim platform is replaced on the mounting arms and screws are passed through the mounting arms, kiss-off sections 21 and swim platform 32, and screwed or bolted in place. FIG. 5 also shows a plurality of down strakes 14 as well as front tank indentations 24 and rear tank indentations 23 which provide additional structural stability for the deep portion 25 of the wake tank 10. It will be understood that preferably the wing sections 22 are approximately 1 inch in height and are hollow and capable of containing liquid except in the kiss-off sections 21 where the bottom surface of the wings 22 is pushed upward into contact with the top surface 16 of the wake tank 10.

Figure 6:
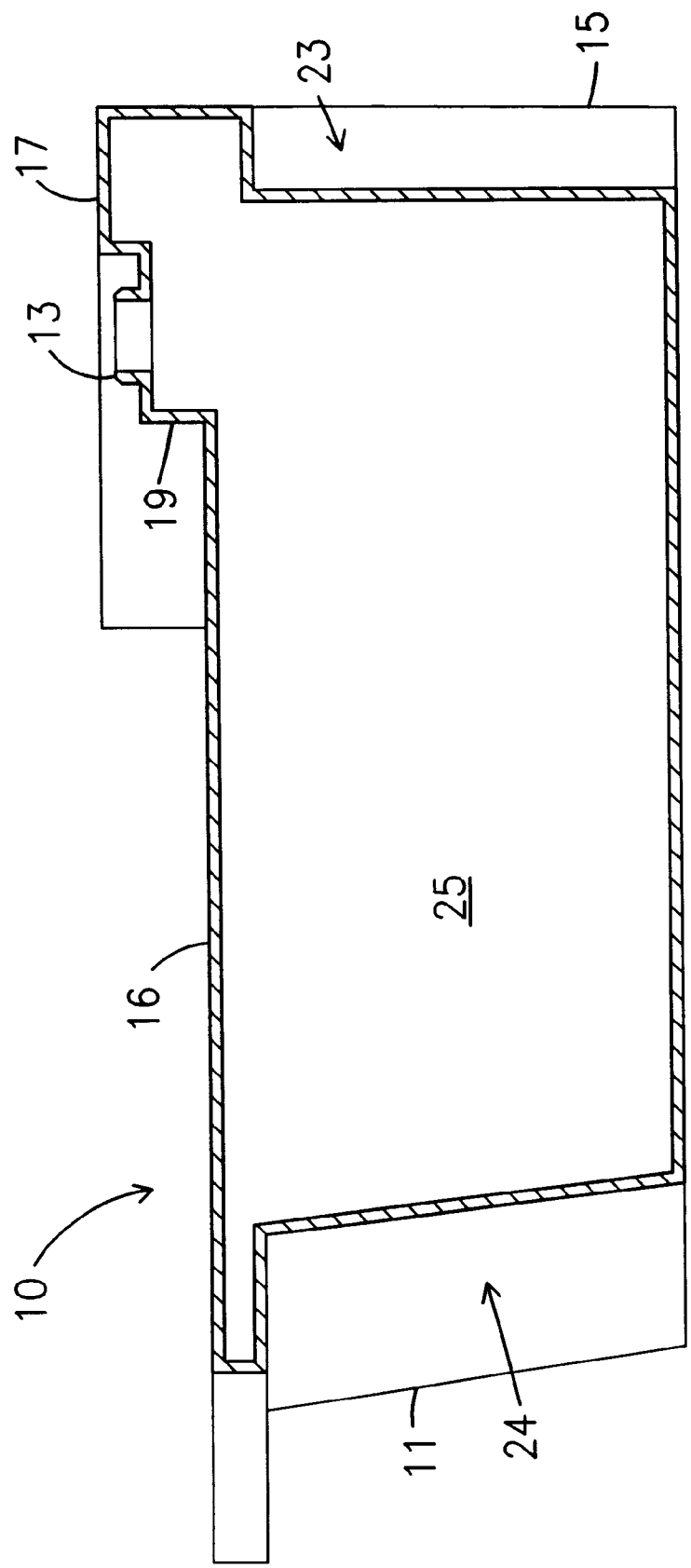
FIG. 6 is a cross sectional view of the boat wake enhancer shown in FIG. 4.

FIG. 6 shows a cross sectional view of a preferred embodiment of the wake tank and particularly illustrates the lower surface 16, riser 19 and upper surface 17 of the top of the wake tank 10. In addition, the central location of plug 13 is shown. A forward indentation 24 and rear indentation 23 of deep portion 25 are also clearly shown.

Figure 7:
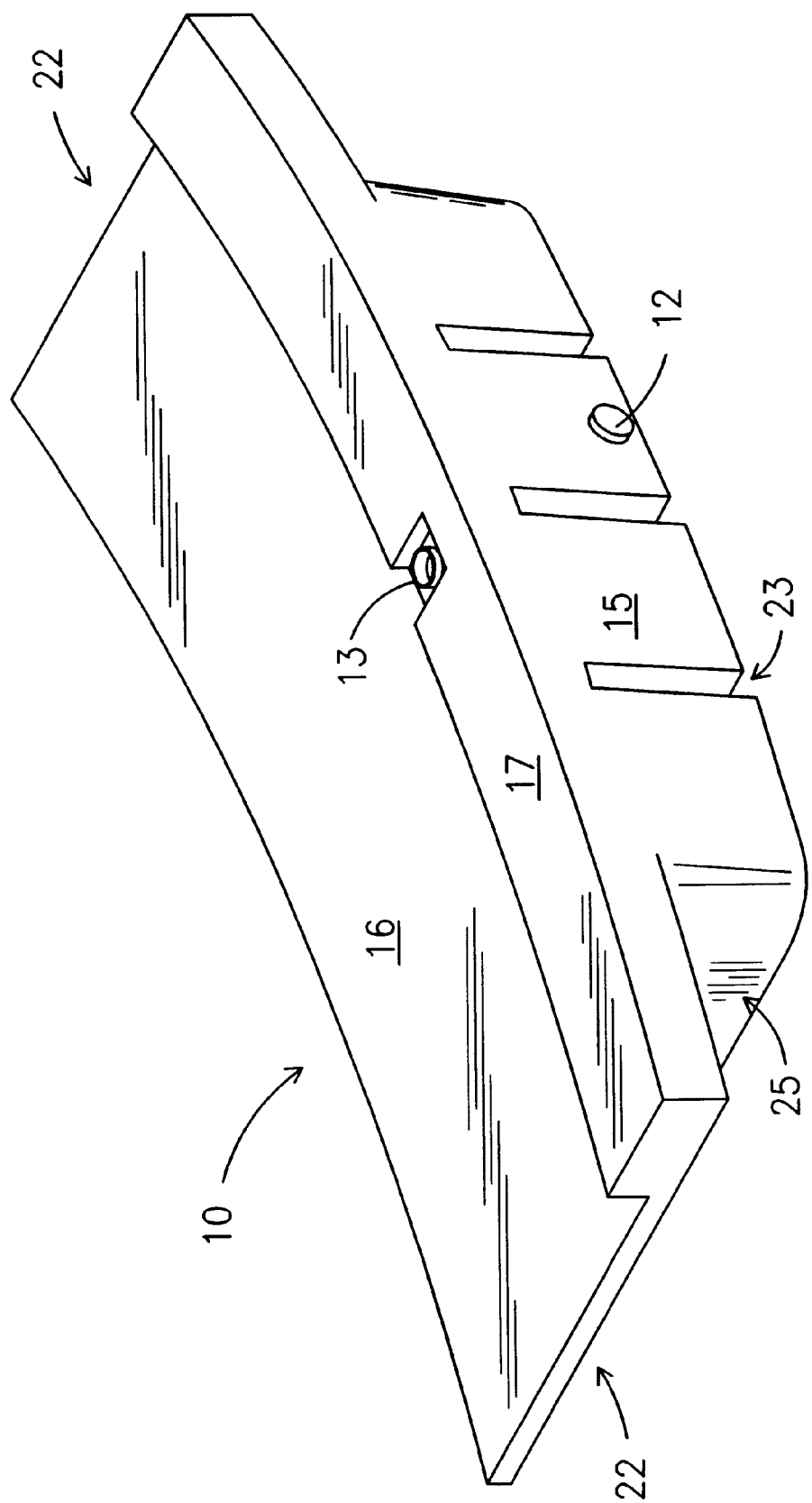
FIG. 7 is a perspective view of the boat wake enhancer shown in FIG. 4.

FIG. 7 is a perspective view of a wake tank 10 according to the present invention clearly showing the location of filling and draining valve 12 which will ride below the water line of ski boat 30 when the wake tank 10 is installed and ski boat 30 is at rest.

In use, the wake tank 10 is attached to the ski boat 30 with bolts, typically in mounting positions also utilized to hold the swim platform. Alternatively, the tank may be mounted in the water when the boat is stationary. The tank may be attached while the boat 30 is out of the water and the tank 10 is empty. When the boat 30 is placed in the water, the tank 10 may remain empty and provide buoyancy to the rear of the ski boat 30 by simply leaving the valve 12 and plug 13 closed. When the boat 30 is driven in this fashion, it will plane more easily and leave a smaller wake than usual.

In order to increase the wake, the boat 30 is brought to a slow speed or stop and valve 12 is opened. At a slow speed or stopped position water will cover the opening of valve 12. In order to permit the water to flow into tank 10 plug 13 must also be opened. When the desired amount of water, and hence weight, has been added to tank 10, valve 12 and plug 13 are closed and the boat 30 is driven.

Figure 2:
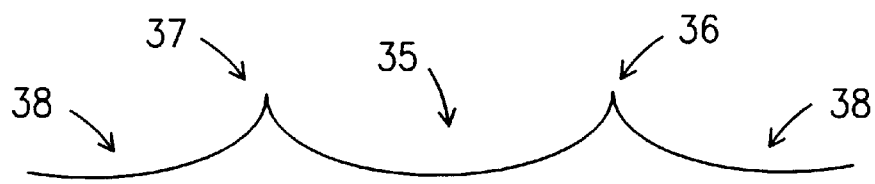
FIG. 2 is a sectional view of a wake created by a typical ski boat.
Figure 3:
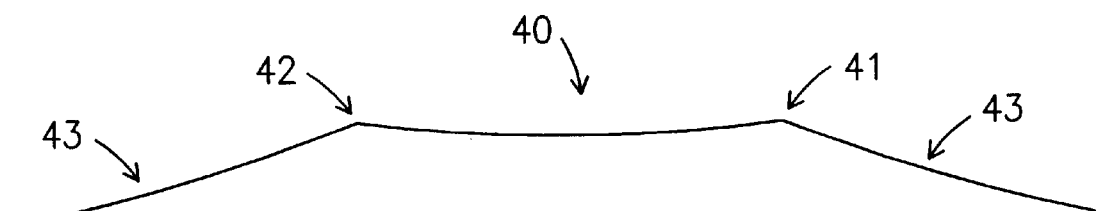
FIG. 3 is a sectional view of a wake created by a ski boat utilizing the present invention.

FIG. 2 shows a typical wake made by a ski boat 30 as seen when facing rearward from the boat. The central portion of the wake 35 is quite turbulent and on either side of the center portion are crests 36, 37. Outside of each crest is a downward sloping concave region 38. When utilizing a filled wake enhancer 10 according to the present invention, the wake characteristics of a ski boat 30 are modified to be more similar to that shown in FIG. 3. The central portion of the wake 40 is relatively flat and less turbulent because of a smoothing effect provided by the bottom surface of the wake enhancer 10. Furthermore, at the sides of the flattened central portion 40 are less angular crests 41, 42, outside of which the wake is gradually reduced to a normal level of the water. The overall height of this wake is greater than comparable wake that would be produced without the wake enhancer yet the outer segments 43 provide a smooth ramp up and the center portion 40 has reduced turbulence thereby providing an improved ski experience. When filled, the wake enhancer 10 produces a larger wake at all boat speeds.

When it is desired to empty the tank 10, valve 12 and plug 13 are reopened and the ski boat is driven at least at moderate speed. This results in value 12 being removed from contact with the water by virtue of the void behind the boat caused by its motion through the water. As a result, water in tank 10 will drain out through valve 12 until plug 13 and/or valve 12 are again closed. When the tank 10 is sufficiently empty the plug 13 and valve 12 should be closed and the boat may be removed from the water.

It will be obvious to those skilled in the art that various changes may be made without departing from the scope and spirit of the invention, and the invention is not to be considered limited to what is shown in the drawings and described in the specifications.

What is claimed is:
1. A wake tank comprising
   a mounting section adapted to position the wake tank rearward of a transom of a ski boat;
   a fluid containing cavity having an upper first closeable opening and a second closeable opening positioned lower on the fluid containing cavity so that the second opening is below the water line when the tank is mounted on a resting ski boat.

2. The wake tank of claim 1 further comprising at least one down strake.

3. The wake tank of claim 1 wherein the fluid containing cavity has a volume sufficient to hold at least about 200 pounds of water.

4. The wake tank of claim 1 wherein the fluid containing cavity has a deep section between about 40 and 45 inches in width.

5. The wake tank of claim 4 wherein a wing extends on either side of the deep section of the fluid containing cavity.

6. The wake tank of claim 5 wherein each wing has at least one kiss-off adapted to be penetrated by a screw and thereby secure said wake tank to a mounting bracket on the ski boat.

7. The wake tank of claim 1 wherein the fluid containing cavity has a volume sufficient to hold between about 350 and 500 pounds of water.

8. The wake tank of claim 3 wherein the fluid containing cavity further comprises a rear wall and the forward and rear walls are reinforced by indentations.

9. The wake tank of claim 1 wherein the length of the tank is greater than 17 inches and less than 36 inches.

10. The wake tank of claim 1 wherein the fluid containing cavity has a top surface above a deep section and the width of the deep section is about three-fourths of the width of the top section.

11. A method of increasing a boat wake comprising the steps of:
    (a) mounting a wake tank having a fluid containing cavity having an upper first closeable opening and a lower second closeable opening rearward of a transom of the ski boat, such that the second opening is below the water line;
    (b) opening said first and second openings while the ski boat is at rest and allowing over 200 pounds of water to enter the fluid containing cavity;
    (c) closing at least said second closeable opening; and
    (d) accelerating the ski boat to skiing speed.

12. The method of claim 11 wherein the wake tank further comprises at least one down strake.

13. The method of claim 11 wherein the fluid containing cavity further comprises a forward wall adapted to be mounted rearward of the transom of a ski boat.

14. The method of claim 11 wherein the fluid containing cavity further comprises a deep section between about 40 and 45 inches in width.

15. The method of claim 14 wherein the fluid containing cavity further comprises a wing which extends on either side of the deep section.

16. The method of claim 15 wherein each wing further comprises at least one kiss-off adapted to be penetrated by a screw and thereby secure said wake tank to a mounting bracket on the ski boat.

17. The method of claim 11 wherein the fluid containing cavity has a volume sufficient to hold between about 350 and 500 pounds of water.

18. The method of claim 13 wherein the fluid containing cavity further comprises a rear wall and the forward and rear walls are reinforced by indentations.

19. The method of claim 11 wherein the length of the tank is greater than 17 inches and less than 36 inches.

20. A wake tank comprising:
    a forward wall adapted to be mounted rearward of the transom of a ski boat;

a fluid containing cavity rear of said forward wall, said fluid containing cavity having a top surface defining a wing on each side of a relatively narrower deep section below said top surface;

an upper first closeable opening communicating with the fluid containing cavity;

a lower second closeable opening positioned underwater when the ski boat is at rest and in communication with the fluid containing cavity;

wherein said fluid containing cavity has a volume sufficient to hold at least 200 pounds of water.

* * * * *